United States Patent
Jayapalan

(10) Patent No.: US 7,281,229 B1
(45) Date of Patent: Oct. 9, 2007

(54) METHOD TO CREATE AN ALTERNATE INTEGRATED CIRCUIT LAYOUT VIEW FROM A TWO DIMENSIONAL DATABASE

(75) Inventor: Jayakannan Jayapalan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 417 days.

(21) Appl. No.: 10/941,233

(22) Filed: Sep. 14, 2004

(51) Int. Cl.
*G06F 17/50* (2006.01)
*G09G 17/00* (2006.01)
*G09G 5/00* (2006.01)
*G06T 15/00* (2006.01)

(52) U.S. Cl. .................. 716/11; 345/419; 345/420; 345/653; 345/655; 345/679; 715/782

(58) Field of Classification Search .......... 716/11; 345/419, 420, 653, 655, 679; 715/782
See application file for complete search history.

(56) References Cited

U.S. PATENT DOCUMENTS

| 5,847,967 | A * | 12/1998 | Asao .......................... 716/5 |
| 7,197,372 | B2 * | 3/2007 | Hazama .................... 700/165 |
| 2004/0015804 | A1 * | 1/2004 | Nakayama et al. ........ 716/10 |
| 2004/0070582 | A1 * | 4/2004 | Smith et al. ............... 345/419 |
| 2004/0212612 | A1 * | 10/2004 | Epstein et al. ............ 345/419 |
| 2005/0134582 | A1 * | 6/2005 | Hermann Claus et al. .. 345/419 |
| 2005/0154481 | A1 * | 7/2005 | Berger et al. .............. 700/98 |
| 2005/0168459 | A1 * | 8/2005 | Baird ........................ 345/419 |
| 2005/0231505 | A1 * | 10/2005 | Kaye et al. ................ 345/421 |
| 2005/0248566 | A1 * | 11/2005 | Vesely et al. ............. 345/419 |
| 2005/0248580 | A1 * | 11/2005 | Osako ....................... 345/560 |
| 2006/0010416 | A1 * | 1/2006 | Keck et al. ................. 716/19 |
| 2006/0192776 | A1 * | 8/2006 | Nomura et al. ............ 345/419 |

FOREIGN PATENT DOCUMENTS

JP  10049704 A * 2/1998

OTHER PUBLICATIONS

Yu et al., ("Layout-based 3D Solid Modeling for IC", proceedings of International Symposium on VLSI Technology, and Applications, May 31, 1995, pp. 108-112).*

(Continued)

*Primary Examiner*—Phallaka Kik
(74) *Attorney, Agent, or Firm*—Martine Penilla & Gencarella, LLP

(57) ABSTRACT

A method in accordance with the present invention prepares an alternate view of an integrated circuit (IC) layout from a top view thereof by selecting an initial polygon representing and IC feature from the top view of the layout, where the initial polygon is defined by a plurality of initial points. The coordinates the plurality of initial points are mapped onto coordinates of a plurality of translated points that define a second polygon representing an alternate view of the initial polygon. The mapping uses at least one of either the height of the initial polygon or the width of the initial polygon. The method can be used, for example and without limitation, to generate a three dimensional view from the top view of the layout or a sectional view of the layout.

16 Claims, 8 Drawing Sheets

OTHER PUBLICATIONS

Kidamdi et al., "Three-Dimensional Defect Sensitivity Modeling for Open Circuits in ULSI Structures", IEEE Transactions on Computer-Aided Design of Integrated Circuits and Systems, vol. 17, No. 4, Apr. 1998, pp. 366-371.*

Chiang et al., "Challenges on Global Routing Correlation", Proceedings of 4th International Conference on ASIC, Oct. 23, 2001, pp. 45-49.*

Li et al., "Substrate Modeling and Lumpted Substrate Resistance Extraction for CMOS ESD/Latchup Circuit Simulation", Proceedings of 36th Design Automation Conference, Jun. 21, 1999, pp. 549-554.*

* cited by examiner

METHOD TO CREATE AN ALTERNATE INTEGRATED CIRCUIT LAYOUT VIEW FROM A TWO DIMENSIONAL DATABASE

BACKGROUND OF THE INVENTION

During design, a layout of an integrated circuits (IC) is typically drawn or rendered in two dimensions from a "top" view of the circuit. In such a view, only one surface of various surface features, such as, without limitation, transistors or interconnect lines, is shown. Thus, such a top view does not illustrate the thickness of circuit features. Additionally, ICs are typically formed of multiple layers, with different circuit features being on different layers. Depending on the topology and number of layers in an IC design, a top view of the design may not provide adequate visualization of the layers. This is particularly the case as IC design becomes more complex and involves more layers.

Three dimensional and sectional renderings of the various layers in an IC, and the thickness of those layers, can be important to allow understanding or complicated IC designs that may include complex interconnect and device structures. Also, a three dimensional rendering can enable faster checking and debugging of non-standard layouts.

Conventional computer aided design (CAD) tools allow an IC design to be laid out in two dimensions. Typically, conversion from such a two dimensions layout drawing into a three dimensional or sectional layout drawing cannot be carried out by such CAD tools. Some CAD type tools do have some capability to convert a two dimensional layout rendering into a three dimensional rendering. One example of such a tool is available under the name Raphael™ from Synopsys®, Inc. of Mountain View Calif. Raphael, however, can only convert a two dimensional IC layout rendering into a three dimensional layout rendering if the layout size is relatively small.

As such, what is needed is a method to convert a two dimensional IC layout rendering accurately and relatively quickly into alternate view renderings such as three dimensional and sectional view renderings.

BRIEF SUMMARY OF THE INVENTION

A method in accordance with the present invention prepares an alternate view of an integrated circuit (IC) layout from a top view thereof by selecting an initial polygon representing and IC feature from the top view of the layout, where the initial polygon is defined by a plurality of initial points. The coordinates the plurality of initial points are mapped onto coordinates of a plurality of translated points that define a second polygon representing an alternate view of the initial polygon. The mapping uses at least one of either the height of the initial polygon or the width of the initial polygon. The method can be used, for example and without limitation, to generate a three dimensional view from the top view of the layout or a sectional view of the layout.

DETAILED DESCRIPTION OF THE INVENTION

Figure 1A:
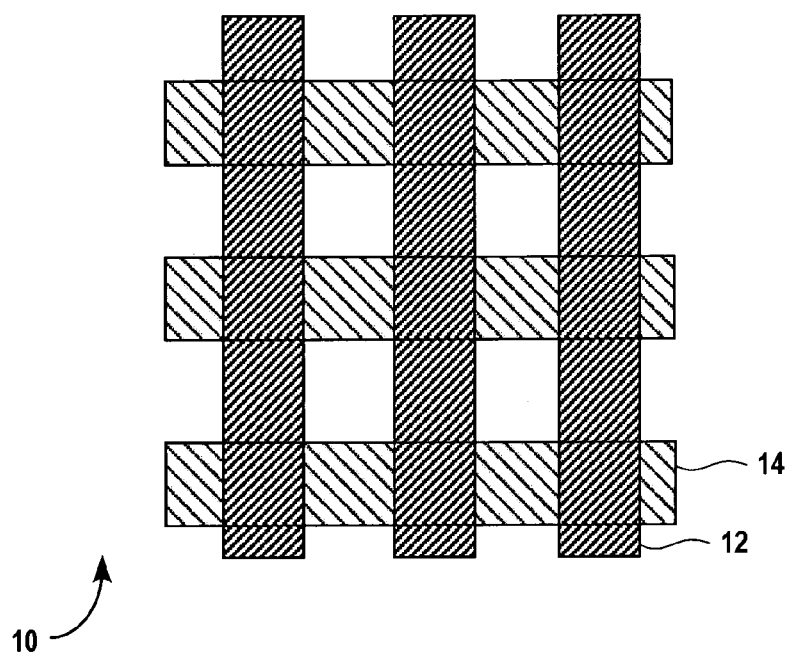
FIG. 1A is a top, two dimensional view of a portion of an IC layout illustrating the appearance of a rendering of a layout prior to converting the rendering to a three dimensional image.

FIG. 1A illustrates an example of a two dimensional rendering of a portion of an IC layout. Specifically, FIG. 1A illustrates an interconnect structure 10 including a first layer 12, second layer 14 and third layer (not shown in FIG. 1A). The third layer of interconnect structure 10 cannot be seen in the two dimensional rendering of FIG. 1A because it is directly below first layer 10.

Figure 1B:
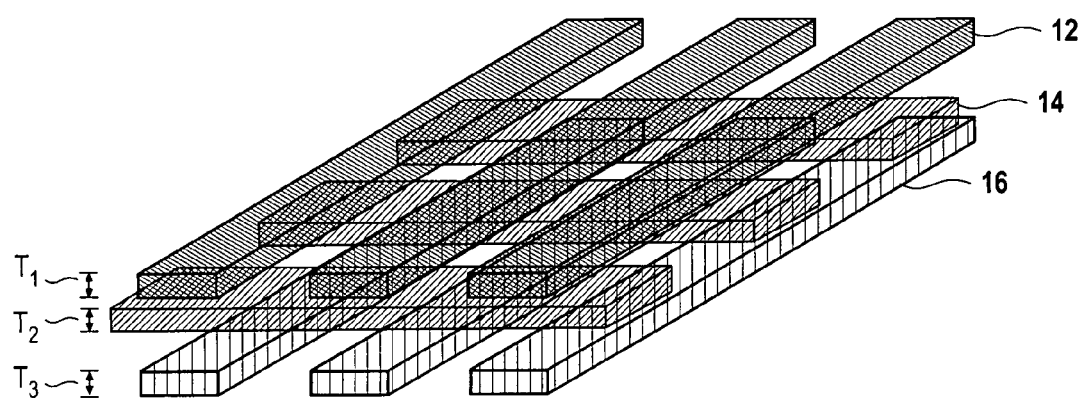
FIG. 1B is a perspective view of a three dimensional rendering of the IC layout shown in FIG. 1 generated in accordance with the present invention.

FIG. 1B illustrates the interconnect structure 10 rendered in a three dimensional view (as used herein, "three dimensional" indicates a three dimensions projected onto two dimensions). In the three dimensional view shown in FIG. 1B, the third layer 16 of interconnect structure 10 can be seen. Also, the qualitative thicknesses of each first layer 12, second layer 14 and third layer 16 can be seen. This can advantageously allow understanding of IC designs that may include complex interconnect and device structures. Also, a three dimensional rendering can enable faster checking and debugging of non-standard layouts. A method in accordance with the present invention converts a two dimensional rendering of an IC layout, such as that shown in FIG. 1A, into a three dimensional rendering of the layout, such as that shown in FIG. 1B.

Figure 2:
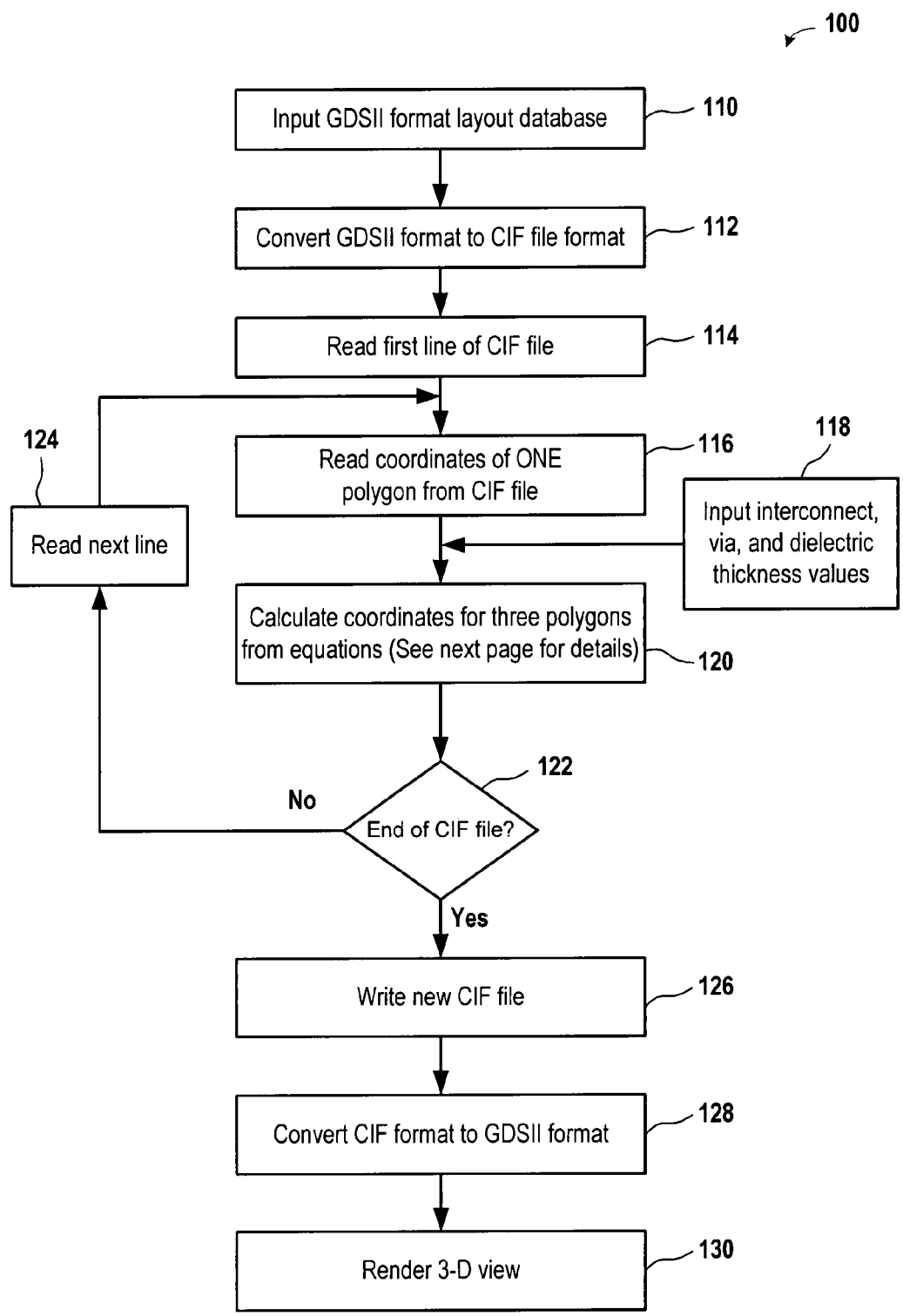
FIG. 2 is a flow chart illustrating a method of generating a three dimensional rendering of an IC layout from a two dimensional rendering thereof in accordance with the present invention.

FIG. 2 is a flowchart illustrating one embodiment of a method 100 for converting a two dimensional IC layout rendering into a three dimensional layout rendering. In the embodiment of method 100 a database including IC layout information is formatted in the GDSII format. Such databases are well understood by those skilled in the art. This is illustrated in step 110 where the initial input to method 100 is taken from a GDSII database. It is considered that IC layout data formatted in any other format also be used as the initial input for method 100. In step 112, the GDSII format is converted to a CIF file format. The CIF file format and conversion from the GDSII file format to the CIF format is well understood in the art.

In step 114, method 100 reads the first line of the CIF file. The CIF file includes coordinates for all the polygons that form a part of the two dimensional rendering of an IC layout. Additionally, the coordinates for a single polygon will all appear on one line of the CIF file. In step 116, the coordinates for one polygon are read from the CIF file. An example of a set of coordinates for a polygon appearing on a line of the CIF file is:

5000 30000 −6715 15000

This example defines a rectangle having a width designated by the first number, 5000, a height designated by the second number, 30000, and a center designated by the third and fourth numbers, the third number providing the x-coordinate, −6715, of the center and the fourth number providing the y-coordinate, 15000, of the center.

In step 118, thickness values for interconnects, vias and dielectric layers are input. In particular, the thickness T1 of first layer 12, the thickness T2 of second layer 14 and the thickness T3 of third layer T3 are input. In the CIF file, each polygon is associated with a layer. When the thicknesses of each layer are input in step 118, this associates each polygon with a thickness.

In step 120, for the two dimensional polygon read from the CIF file in step 116, coordinates for a three dimensional polygon are generated. The coordinates for the three dimensional polygon are preferably generated from the coordinates of corresponding two dimensional polygon, the thickness of the IC feature (e.g. interconnect, via or dielectric layer) represented by the polygon entered in step 118, and a desired viewing angle. Preferably, the three dimensional polygon is generated based on three, two dimensional polygons. A preferred embodiment for calculating the coordinates for the three, two dimensional polygons is discussed below.

In step 122, it is determined if the end of the CIF file has been reached. If the end of the CIF file has not been reached, that is, if there are still coordinates for two dimensional polygons included in the CIF file that have not yet been translated into coordinates for three dimensional polygons, then, in step 124, the next line of the CIF file is read. This loop continues until all of the coordinates representing two dimensional polygons in the CIF file have been converted, in step 120, into coordinates representing three dimensional polygons. Then, in step 126, a new CIF file is written representing a three dimensional rendering of the IC layout represented by the CIF file converted in step 112 from a GDSII format. In step 128, this new CIF file is preferably converted back into a GDSII format. Generation of the new CIF file and conversion thereof into a GDSII format is well understood in the art.

Figure 3:
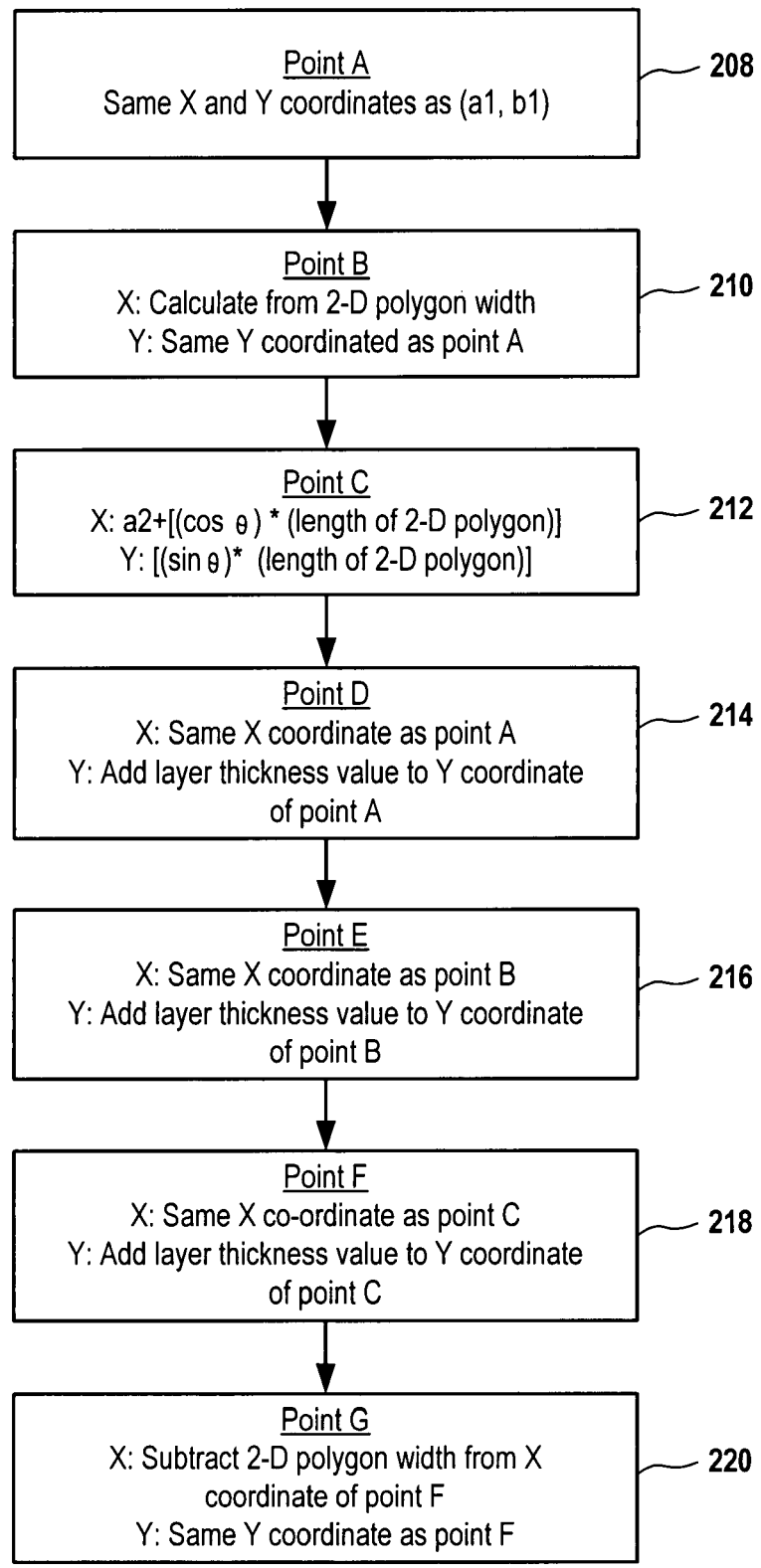
FIG. 3 is a flow chart detailing a method of calculating coordinates for a three dimensional view of an IC layout in accordance with the present invention.
Figure 4B:
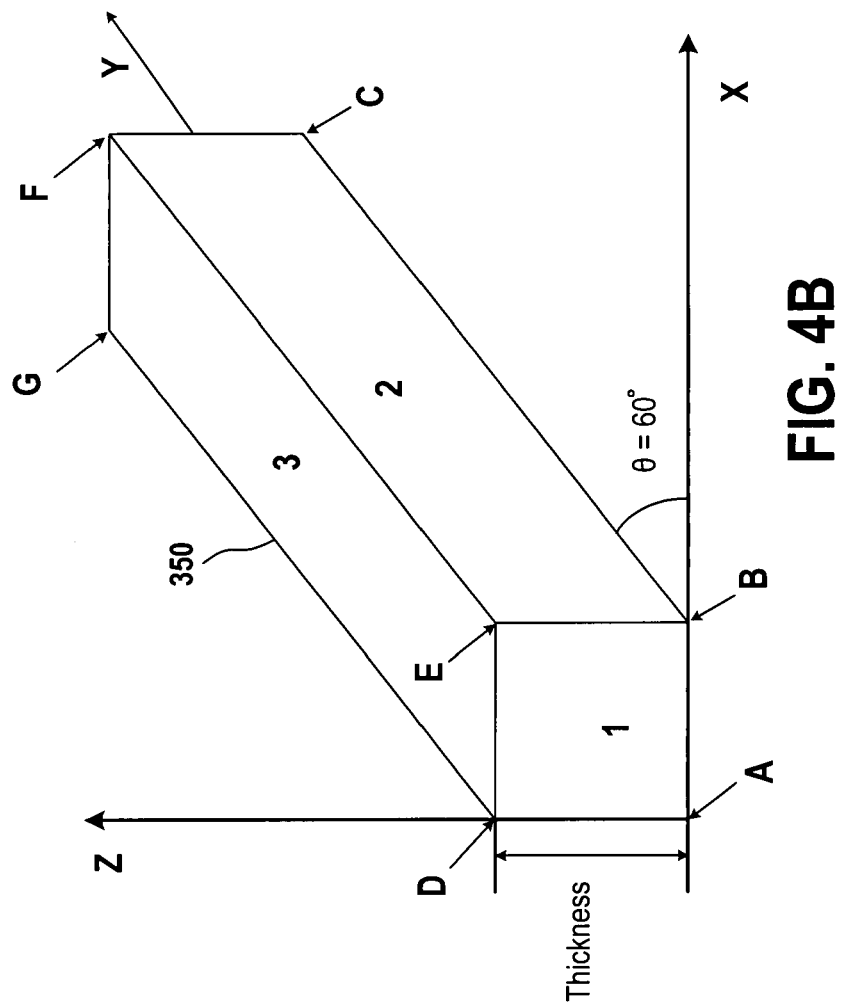
FIG. 4B is a three dimensional view of the polygon illustrated in FIG. 4A.
Figure 4A:
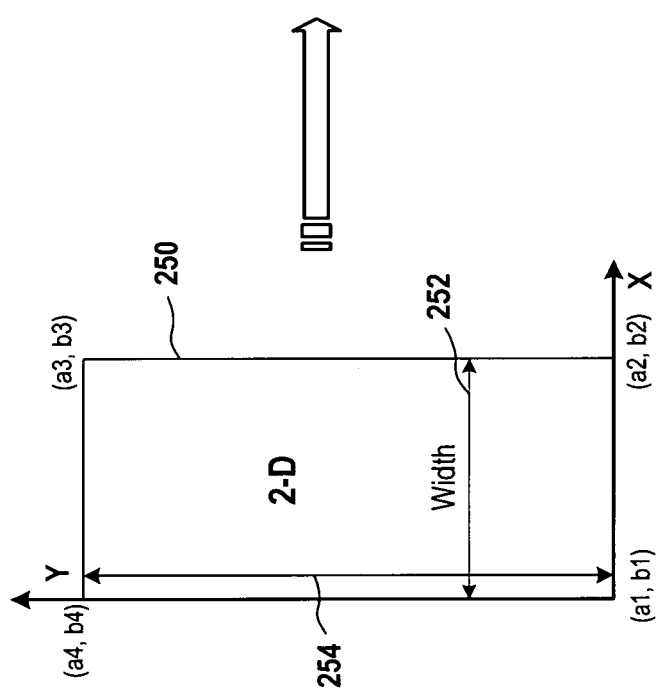
FIG. 4A is a two dimensional view of an IC layout feature represented by a polygon that may be transformed into a three dimensional view by a method in accordance with the present invention.

FIGS. 3, 4A and 4B illustrate one embodiment of a method 200 of generating coordinates for a three dimensional rendering of a polygon as discussed above with respect to step 120 of method 100. FIG. 4A illustrates a polygon 250 that would represent a polygon the coordinates of which would be included in a CIF file representing a two dimensional rendering of an IC layout. FIG. 5A illustrates rectangular box 350 which represents a three dimensional rendering of polygon 250. Method 200 generates coordinates for rectangular box 350 from the coordinates of polygon 250. Polygon 250 is defined by four ordered pairs of two coordinates each: first ordered pair (a1, b1), second ordered pair (a2, b2), third ordered pair (a3, b3) and fourth ordered pair (a4, b4). Additionally, polygon 250 has width 252, defined by the difference between coordinate a2 and coordinate a1, and height 254, defined by the difference between the coordinate b4 and b1. Rectangular box 350 is defined by 7 ordered pairs each having an X and Y coordinate. Each of the 7 ordered pairs defining rectangular box 350 provides one of 7 points: A, B, C, D, E, F and G.

Method 200 shown in FIG. 3 provides a process for determining each of the 7 points A, B, C, D, E, F, and G from the coordinates of polygon 254 and additional information provided in method 100 discussed above. As shown in step 208, point A of rectangular box 350 is defined by the coordinates (a1, b1) defining the lower left hand corner of polygon 250. In step 210, the X coordinate of point B is determined by adding the width 252 of polygon 250 to coordinate a1. The Y coordinate of point B is the same as the Y coordinate of point A. In step 212, the coordinates for point C are determined. The X and Y coordinates for point C are given by, respectively:

$X$ coordinate=$a2$+[(length 254 of polygon 250)(cos θ)]

$Y$ coordinate=(length 254 of polygon 250)(sin θ)

where, as shown in FIG. 4B, θ is the viewing angle of the three dimensional rendering of rectangular box 350.

In step 214, the coordinates for point D are determined. The X coordinate of point D is the same as the X coordinate for point A. The Y coordinate of point D is the thickness of the feature or layer represented by polygon 250 added to the Y coordinate of point A. As discussed above with respect to FIG. 3, the thickness values for the layers and features of the IC layout were entered in step 118 of method 100. The thickness value for the layer or feature represented by polygon 250 is used in step 214 to calculate the Y coordinate for point D. In step 216, the coordinates for point E are calculated. The X coordinate of point E is the same as the X coordinate for point B. The Y coordinate for point E is calculated by adding the thickness of the feature represented by polygon 250 to the Y coordinate of point B. In step 218, the coordinates for point F are determined. The X coordinate for point F is the same as the X coordinate for point C. The Y coordinate for point F is determined by adding the thickness of the feature represented by polygon 250 to the Y coordinate of point C. In step 220, the coordinates for point G are determined. The X coordinate of point G is determined by subtracting the width 252 of polygon 250 from the X coordinate of point F. The Y coordinate of point G is the same as the Y coordinate of point F.

Figure 5:
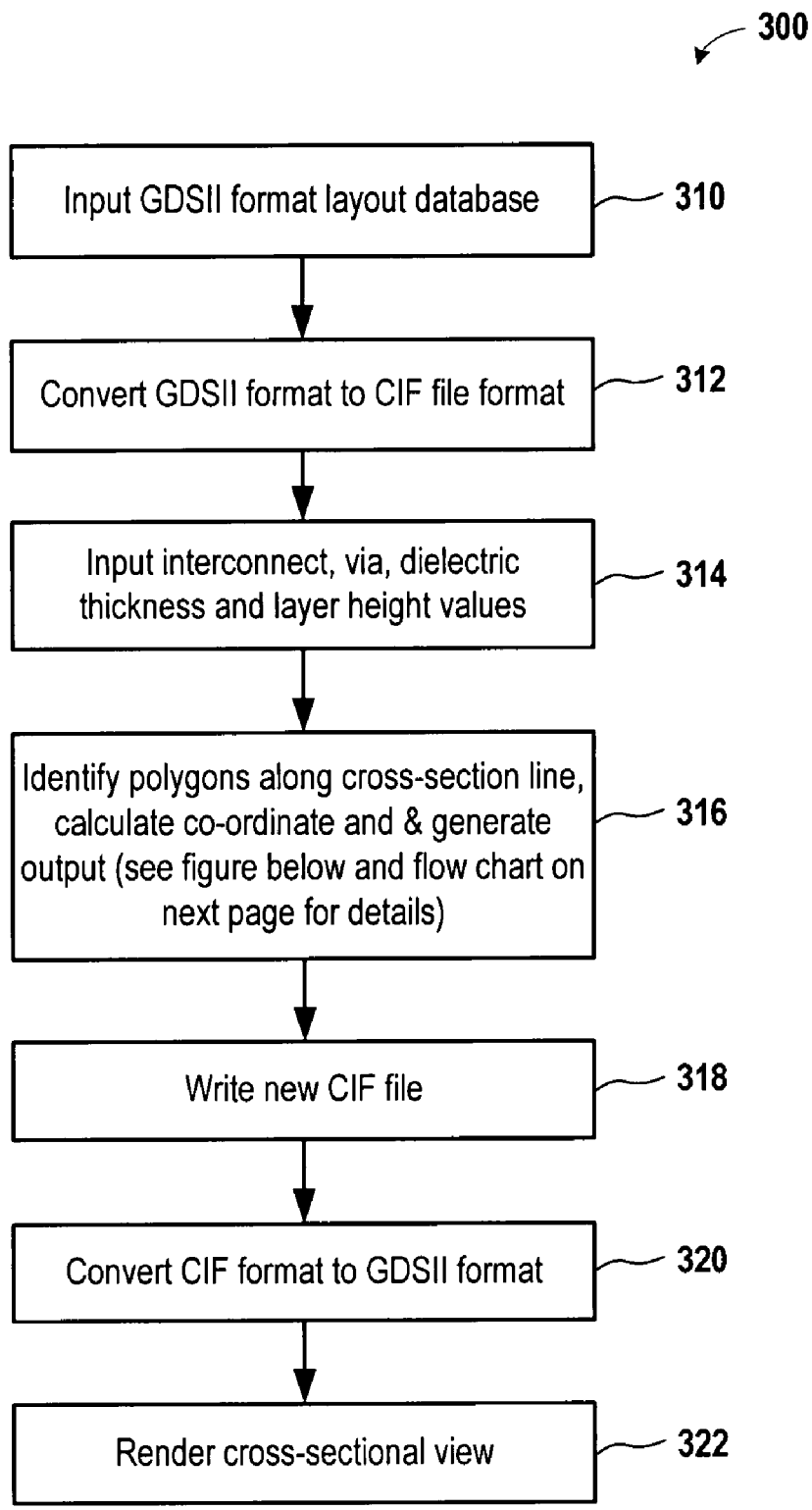
FIG. 5 is a flow chart illustrating a method of generating a cross-sectional view of an IC layout from a two dimensional view thereof in accordance with the present invention.
Figure 6A:
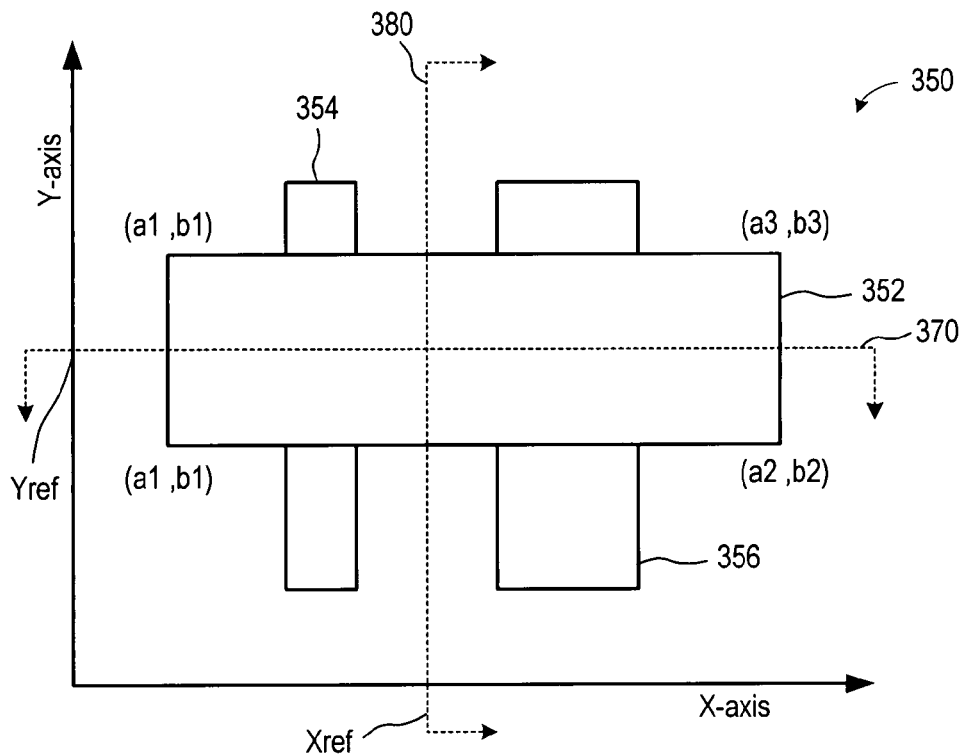
FIG. 6A is a two dimensional view of an IC layout represented by a plurality of polygons that may be transformed into a cross-sectional view by a method in accordance with the present invention.
Figure 6B:
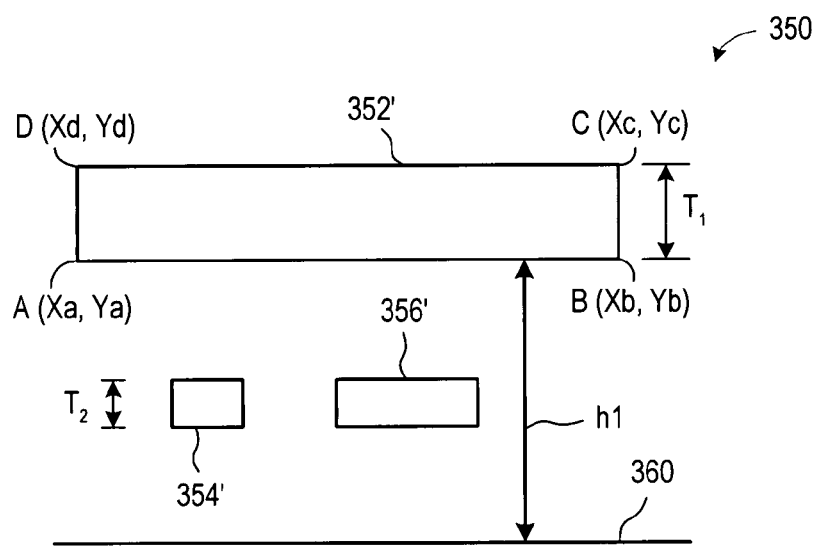
FIG. 6B is a cross-sectional view of the IC layout illustrated in FIG. 6A taken along a horizontal section line.

FIGS. 5, 6A, 6B, 6C and 7 illustrate a method of generating a file that represents a cross-sectional view of an IC layout from a file representing a two dimensional rendering of the IC layout. FIG. 6A illustrates a portion of an IC layout 350 from a top view. IC layout 350 includes first feature 352, second feature 354 and third feature 356. First feature 352 is represented by a polygon, in particular a rectangle, defined by coordinates a1, b1, a2, b2, a3, b3, a4 and b4. Though not visible in FIG. 6A, IC layout 350 includes two layers with first feature 352 being on a first layer and second and third features 354 and 356 being on a second layer beneath the first layer. In a method in accordance with the present invention, a cross-sectional view of IC layout 350 is generated from the top view of layout 350 shown in FIG. 6A. FIG. 6B illustrates a cross-sectional view of IC layout 350 taken along a horizontal section line 370 crossing the Y-axis at coordinate Yref shown in FIG. 6A. A view of first feature 352 along section line 370 is shown by polygon 352', a view of second feature 354 along line section line 370 is shown by polygon 354' and a view of third feature 356 along line 370 is shown by polygon 356'. Polygon 356' can be defined by four points A, B, C and D. Point A has coordinates Xa, Ya; point B has coordinates Xb, Yb; point C has coordinates Xc, Yc; and point D has coordinates Xd, Yd. Additionally, it can be seen that first feature 352 is in a first layer at a height h1 above a predetermined baseline 360, the first layer containing feature 352 has a thickness T1 and the second layer containing features 354 and 356 has a thickness T2.

Figure 6C:
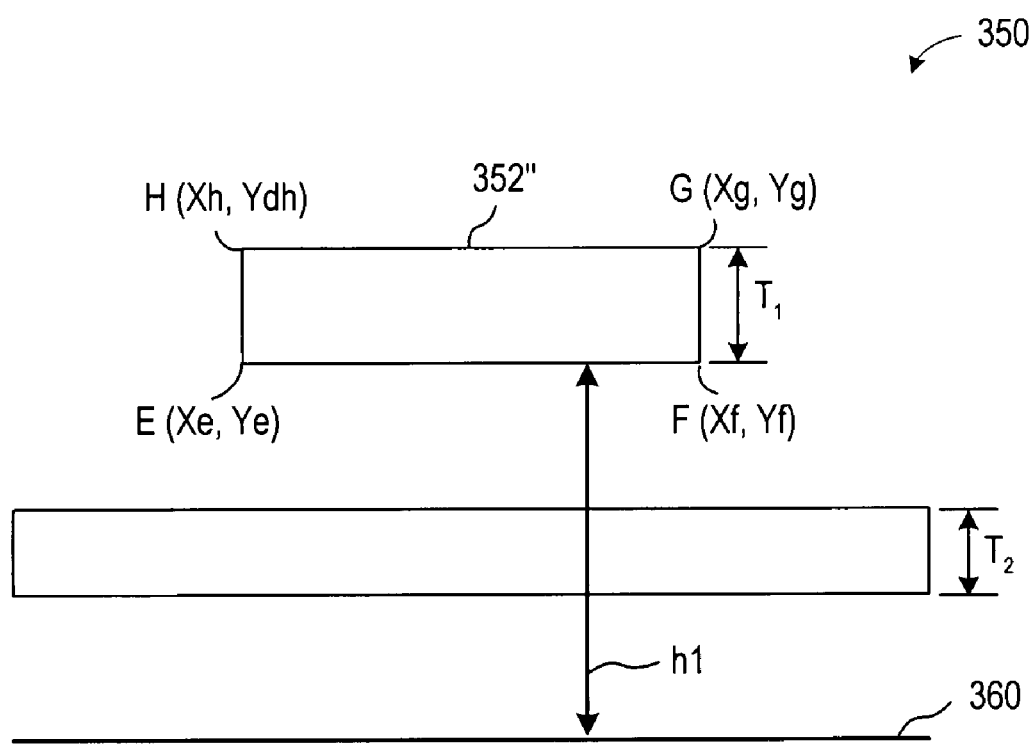
FIG. 6C is a cross-sectional view of the IC layout illustrated in FIG. 6A taken along a vertical section line.

FIG. 6C illustrates a cross-sectional view of IC layout 350 taken along a vertical section line 380 crossing the X-axis at coordinate Xref shown in FIG. 6A. A view of first feature 352 along section line 380 is shown by polygon 352" of FIG. 6C. Polygon 352" can be defined by four points E, F, G and H. Point E has coordinates Xe, Ye; point F has coordinates Xf, Yf; point G has coordinates Xg, Yg; and point H has coordinates Xh, Yh.

FIG. 5 is an embodiment of a method 300 of generating a cross-sectional view of an IC layout from file including a top view of the IC layout. In the embodiment of method 300, and as discussed with respect to step 110 of method 100 above, in step 310 a GDSII format database including a top view, two dimensional rendering of an IC layout is input. It is considered that IC layout data formatted in any other format also be used as the initial input for method 300. Also as discussed above with respect to step 112 of method 100, in step 312 the GDSII file format is converted to a CIF file format. The GDSII and CIF file formats, and conversion from the GDSII format to the CIF format, are well understood in the art. In step 314, the thicknesses of each layer, interconnect, and via in layout 350 are input. In the example of FIGS. 6A, 6B and 6C the thickness T1 of the first layer having first feature 352, shown by polygon 352' and the thickness T2 of the second layer including feature 354 and 356 are input. Additionally, the height of each layer of IC layout 350 from a predetermined baseline are entered in step 314. In particular, regarding the example of FIGS. 6A, 6B and 6C both the height h1 of the first layer of IC layout 350 above baseline 360 which could, for example, represent a silicon substrate on which the IC would be formed, and the height h2 of the second layer above baseline 360 are input.

As will be discussed in detail below, the coordinates for rendering a cross-sectional view of polygons intersecting the section lines through which a cross-section is desired are determined. In step 318 a new CIF file representing the cross-sectional view of the IC layout is written. And, in step 320, the CIF file written in step 318 is converted into a GDSII format in a known manner. In step 322, from the GDSII file a cross-sectional view of IC layout 350 can be rendered in a known manner.

Figure 7:
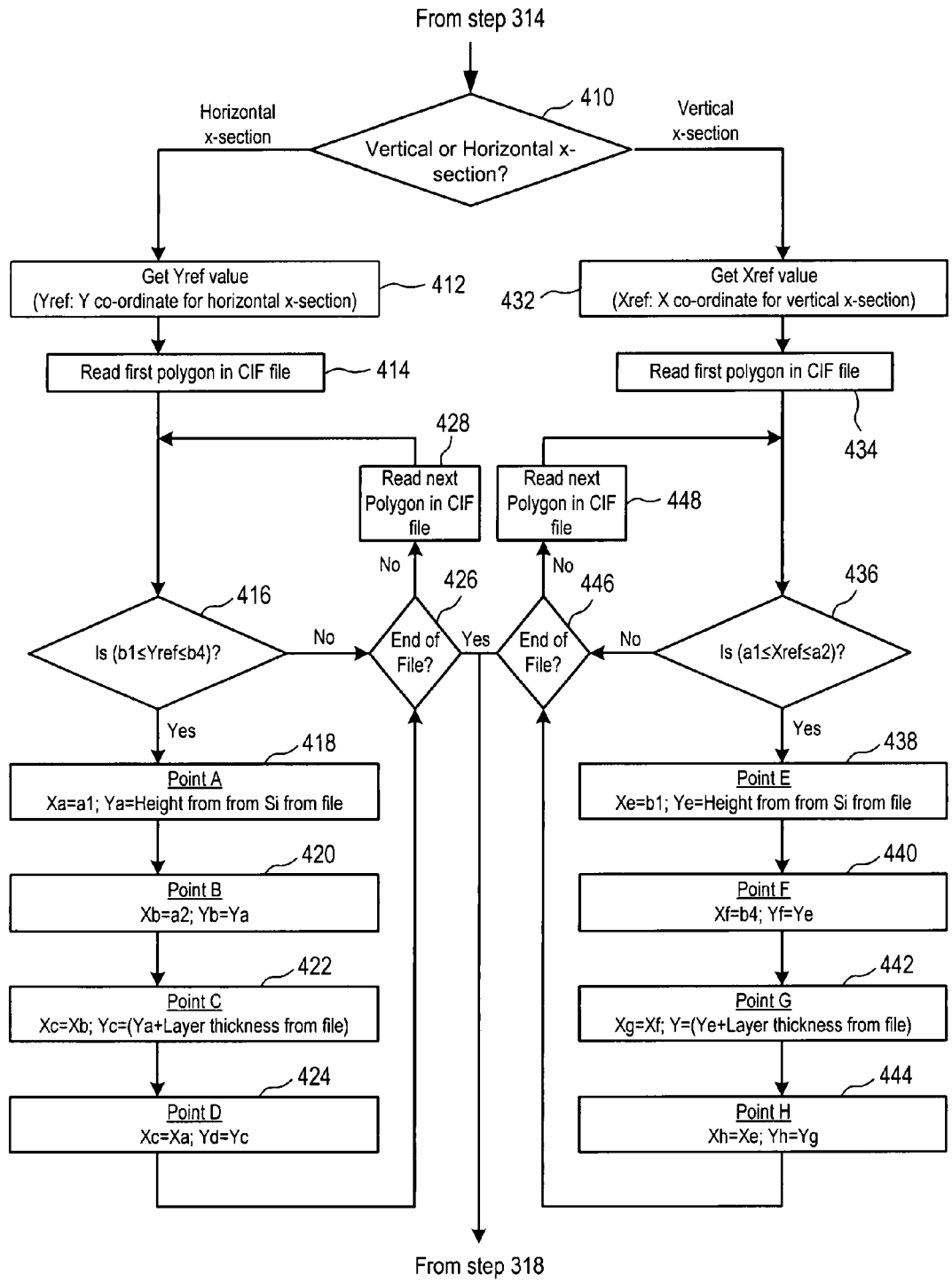
FIG. 7 is a flow chart detailing a method of determining coordinates of a cross-sectional view of an IC layout from a two dimensional view thereof in accordance with the present invention.

FIG. 7 is a flow chart illustrating one embodiment of the details of a method generating coordinates for a cross-sectional view of a polygon representing an IC layout feature as discussed above with respect to step 316 of method 300. In step 410, it is determined whether the cross-section desired is a vertical or horizontal. The cross-section is vertical if the coordinate along which a cross-section is to be rendered is an X-coordinate and the cross-section is vertical if the coordinate input in step 316 is horizontal. If the cross-section is to be horizontal, in step 412, the value of the Y coordinate defining the section line is input. As noted above, the CIF file contains coordinates defining a group of polygons that form the IC layout. In step 414, the coordinates for the first polygon in the CIF file is read. In an example in which method 300 is operating on a polygon representing first feature 352, at least coordinates a1, and a2, b1 and b4 are determined from the CIF file. In step 416 it is determined whether the first polygon intersects with the horizontal line through the selected Y-coordinate. This is done by determining whether the value of the Y-coordinate of the uppermost edge of the selected polygon is greater than the value of the Y-coordinate of the section line and if the Y-value of the section line is, in turn, greater than the value of the Y-coordinate of the lower edge of the selected polygon. In particular, referring to FIG. 6A, if feature 352 is the selected polygon, it is determined if the value of coordinate b4 is greater than the value of Yref and if the value of Yref is simultaneously greater than the value of b1.

If this condition is met, then a first point A for rendering a cross-sectional view of feature 352, shown as polygon 352' in FIG. 6B, is determined is step 418. In particular, the X-coordinate of point A, Xa is given by the coordinate a1, which was read from the CIF file in step 414 and the Y-coordinate of point A, Ya is given by the height h1 of the layer of feature 352 above a predetermined baseline 360. As noted above, baseline 360 can be the surface of a silicon substrate. In step 420 point, a second point B for rendering a cross-sectional view of a feature 352 is determined. In particular, the X-coordinate of point B, Xb is given by the coordinate a2, which was read from the CIF file in step 414 and the Y-coordinate of point B, Yb is the same as coordinate Ya. In step 422, a third point C for rendering a cross-sectional view of feature 352 is determined. In particular the X-coordinate of point C, Xc is the same as coordinate Xb and the Y-coordinate of point C, Yc is determined by adding coordinate Ya and the thickness of the layer that feature 352 is part of, which was input in step 412. Finally, in step 424, a fourth point D for rendering a cross-sectional view of feature 352 is determined. In particular, the X-coordinate of point D, Xd is the same as coordinate Xa and the Y-coordinate point D, Yd is the same as coordinate Yc.

In step 426, it is determined if the end of the CIF file has been reached. If it has, then step 316 passes to step 318 discussed above. If the end of the CIF file has not been reached, then in step 428, the next polygon in the CIF file is read and steps 416 through 426 are repeated until the end of the CIF file is reached. Referring back to step 416, if it is determined that the polygon presently under consideration does not intersect the cross-section line defined by the Y-coordinate entered in step 412, then the method bypasses steps 418 through 424 and passes directly to step 426 to determine if the end of the CIF file has been reached.

If in step 410, it is determined that a vertical cross section is desired, then steps 432 through 448 are implemented, which carry out a process similar to that described above with respect to steps 412 through 428. In step 432, the X-coordinate defining the vertical section line for the cross-sectional rendering is obtained. In the example of FIG. 6A, the vertical section line is shown as section line 380 defined by the X-coordinate Xref. In step 434, the first polygon in the CIF file is read. In particular, referring to FIG. 6A, if the first polygon in the CIF file is the polygon representing feature 352, then at least the Y-coordinates a1, a2, b1 and b4 are read to be used by method 300. In step 436 it is determined whether the selected polygon, in the present example, the polygon representing feature 352, intersects with the chosen section line. In particular, in the example of FIG. 6A, it is determined if the value of coordinate Xref is between the value of X-coordinates a1 and a2.

If so, the method moves to step 438 through 444 in which the coordinates of four points for rendering a polygon 352" that is a cross-sectional view of the polygon representing feature 352 are determined. Referring to the example of FIG. 6A and FIG. 6C which is a cross-sectional view of IC layout 350 taken along section line 380, in step 438 the coordinates for point E are determined. In particular, the X-coordinate for point E, Xe is given by coordinate b1 and the Y-coordinate for point E, Ye is given by the height h1 of polygon 352" above baseline 360. In step 440 the coordinates for point F of polygon 352" are determined. The X-coordinate of point F, Xf is given by coordinate b4 and the Y-coordinate of point F, Yf is given by coordinate Ye. In step 442 the coordinates for point G of polygon 352" are determined. The X-coordinate of point G, Xg is given by Xf and the Y-coordinate of point G, Yg is given by Ye plus the layer thickness T of the layer of feature 352 entered in step 314. In step 444 the coordinates of point H are determined. The X-coordinate of point H, Xh is given by Xe and the Y-coordinate of point His given by Yg.

After step 444, method 300 moves to step 446. Method 300 may also move to step 446 if, in step 436, it is determined that vertical section line 380 does not intersect with the currently selected polygon. In step 446 it is determined if the end of the CIF file has been reached. If so, then method 300 moves to step 322. If not, then in step 448, the next polygon in the CIF file is read and method 300 once again moves to step 436.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed as new and desired to be protected by Letters Patent of the United States is:

1. A method of preparing a three dimensional view of an integrated circuit (IC) layout including:
   selecting an initial polygon representing an IC feature from a two dimensional view of the IC layout, the initial polygon including a plurality of points defining a first dimension and a second dimension of the initial polygon;
   generating a first polygon of the three dimensional view based on at least one of the points of the plurality of points, the first dimension of the initial polygon and a thickness of the IC feature represented by the initial polygon;
   generating a second polygon of the three dimensional view based at least one point of the first polygon, a second dimension of the initial polygon, and a rendering angle at which the three dimensional view is to be rendered;
   generating a third polygon of the three dimensional view based on at least one point of the second polygon and the first dimension of the initial polygon such that the three dimensional view of the IC feature including the first, second and third polygon is rendered.

2. The method of claim 1 wherein generating a first polygon includes:
   selecting at least a first point of the three dimensional view from the plurality of points;
   determining a second point of the three dimensional view based on the first point and the first dimension;
   determining a third point of the three dimensional view based on the first point and the thickness of the IC feature represented by the initial polygon;
   determining a fourth point of the three dimensional view based on the second point and the thickness of the IC feature represented by the initial polygon such that at least a first portion of the three dimensional view of the IC layout from the first, second, third and fourth points is rendered.

3. The method of claim 2 wherein determining the second point includes:
   calculating a first coordinate of the second point by adding the thickness of the IC feature represented by the initial polygon to a first coordinate of the first point; and
   determining a second coordinate of the second point that is the same as the second coordinate of the first point.

4. The method of claim 3 wherein determining the third point includes:
   determining a first coordinate of the third point that is the same as the first coordinate of the first point; and
   calculating a second coordinate of the third point by adding the thickness of the IC feature represented by the initial polygon to a second coordinate of the first point.

5. The method of claim 4 wherein determining the fourth point includes:
   determining a first coordinate of the fourth point that is the same as the first coordinate of the second point; and
   calculating a second coordinate of the fourth point by adding the thickness of the IC feature represented by the initial polygon to a second coordinate of the second point.

6. The method of claim 2 wherein generating the second polygon includes:
   determining a fifth point of the three dimensional view based on the second point and a transformation calculation using the second dimension of the polygon and the rendering angle; and
   determining a sixth point of the three dimensional view based on the third point and the thickness of the feature represented by the initial polygon such that at least a second portion of the three dimensional view from the second, fourth, fifth and sixth points is rendered.

7. The method of claim 6 wherein determining a fifth point includes:
   calculating a first coordinate of the fifth point by multiplying a cosine of the rendering angle by the second dimension of the initial polygon and adding a result of said multiplying to a first coordinate of the second point; and
   calculating a second coordinate of the fifth point by multiplying a sine of the rendering angle by the second dimension of the initial polygon and adding a result of said multiplying a sine, to a second coordinate of the second point.

8. The method of claim 7 wherein determining a sixth point includes:
   determining a first coordinate of the sixth point that is the same as the first coordinate of the fifth point; and
   calculating a second coordinate of the sixth point by adding the thickness of the feature represented by the initial polygon to the second coordinate of the fifth point.

9. The method of claim 6 wherein generating the third polygon includes:
   determining a seventh point of the three dimensional view based on the sixth point and the first dimension of the initial polygon such that at least a third portion of the three dimensional view from the third, fourth, sixth and seventh points is rendered.

10. The method of claim 9 wherein determining the seventh point includes:

calculating a first coordinate of the seventh point by subtracting the first dimension of the initial polygon from the first coordinate of the sixth point; and calculating a second coordinate of the seventh point that is the same as the second coordinate of the sixth point.

11. A computer readable medium having computer readable code for preparing a three dimensional view of an integrated circuit (IC) layout, the computer readable code causing the computer to:

select an initial polygon representing an IC feature from a two dimensional view of the IC layout, the initial polygon including a plurality of points defining a first dimension and a second dimension of the initial polygon;

generate a first polygon of the three dimensional view based on at least one of the points of the plurality of points, the first dimension of the initial polygon and a thickness of the IC feature represented by the initial polygon;

generate a second polygon of the three dimensional view based at least one point of the first polygon, a second dimension of the initial polygon, and a rendering angle at which the three dimensional view is to be rendered;

generate a third polygon of the three dimensional view based on at least one point of the second polygon and the first dimension of the initial polygon such that the three dimensional view of the IC feature including the first, second and third polygon is rendered.

12. The computer readable medium of claim 11 wherein to generate the first polygon the computer readable code further causes the computer to:

select at least a first point of the three dimensional view from the plurality of points;

determine a second point of the three dimensional view based on the first point and the first dimension;

determine a third point of the three dimensional view based on the first point and the thickness of the IC feature represented by the initial polygon; and determine a fourth point of the three dimensional view based on the second point and the thickness of the IC feature represented by the initial polygon such that at least a first portion of the three dimensional view of the IC layout from the first, second, third and fourth points may be rendered.

13. The computer readable medium of claim 12 wherein to generate the second polygon the computer readable code further causes the computer to:

determine a fifth point of the three dimensional view based on the second point and a transformation calculation using the second dimension of the polygon and the rendering angle; and determine a sixth point of the three dimensional view based on the third point and the thickness of the feature represented by the initial polygon such that at least a second portion of the three dimensional view from the second, fourth, fifth and sixth points may be rendered.

14. The computer readable medium of claim 13 wherein to generate a first polygon the computer readable code further causes the computer to:

determine a seventh point of the three dimensional view based on the sixth point and the first dimension of the initial polygon such that at least a third portion of the three dimensional view from the third, fourth, sixth and seventh points may be rendered.

15. A method of preparing a three dimensional view of an integrated circuit (IC) layout including:

selecting an initial polygon representing an IC feature from a two dimensional view of the IC layout, the initial polygon including a plurality of points defining a first dimension and a second dimension of the initial polygon;

generating a first polygon of the three dimensional view based on at least one of the points of the plurality of points, the first dimension of the initial polygon and a thickness of the IC feature represented by the initial polygon by selecting at least a first point of the three dimensional view from the plurality of points; determining a second point of the three dimensional view based on the first point and the first dimension; determining a third point of the three dimensional view based on the first point and the thickness of the IC feature represented by the initial polygon; determining a fourth point of the three dimensional view based on the second point and the thickness of the IC feature represented by the initial polygon, said second point being determined by calculating a first coordinate of the second point by adding the thickness of the IC feature represented by the initial polygon to a first coordinate of the first point; and determining a second coordinate of the second point that is the same as the second coordinate of the first point;

generating a second polygon of the three dimensional view based at least one point of the first polygon, a second dimension of the initial polygon, and a rendering angle at which the three dimensional view is to be rendered; and generating a third polygon of the three dimensional view based on at least one point of the second polygon and the first dimension of the initial polygon such that the three dimensional view of the IC feature including the first, second and third polygon is rendered.

16. A computer readable medium having computer readable code for preparing a three dimensional view of an integrated circuit (IC) layout, the computer readable code causing the computer to:

select an initial polygon representing an IC feature from a two dimensional view of the IC layout, the initial polygon including a plurality of points defining a first dimension and a second dimension of the initial polygon by the computer readable code causing the computer to select at least a first point of the three dimensional view from the plurality of points; determine a second point of the three dimensional view based on the first point and the first dimension; determine a third point of the three dimensional view based on the first point and the thickness of the IC feature represented by the initial polygon; and determine a fourth point of the three dimensional view based on the second point and the thickness of the IC feature represented by the initial polygon;

generate a first polygon of the three dimensional view based on at least one of the points of the plurality of points, the first dimension of the initial polygon and a thickness of the IC feature represented by the initial polygon;

generate a second polygon of the three dimensional view based at least one point of the first polygon, a second dimension of the initial polygon, and a rendering angle at which the three dimensional view is to be rendered by the computer readable code cause the computer to determine a fifth point of the three dimensional view based on the second point and a transformation calculation using the second dimension of the polygon and the rendering angle; determine a sixth point of the three dimensional view based on the third point and the thickness of the feature represented by the initial polygon;

generate a third polygon of the three dimensional view based on at least one point of the second polygon and the first dimension of the initial polygon such that the three dimensional view of the IC feature including the first, second and third polygon is rendered.

* * * * *